April 13, 1937.  J. W. LEIGHTON  2,076,852
ADJUSTABLE HINGE JOINT
Filed Oct. 27, 1933.  2 Sheets-Sheet 1

Inventor.
John Wycliffe Leighton.

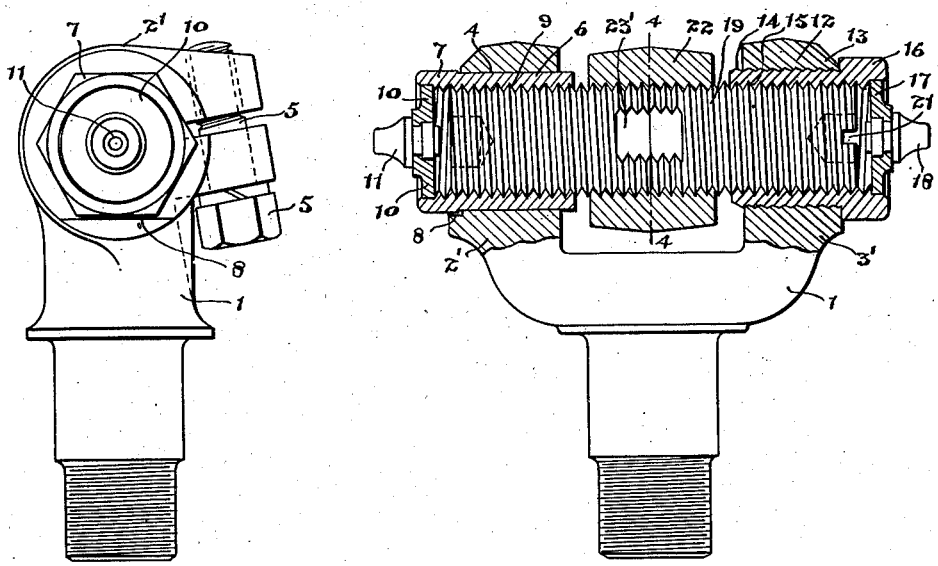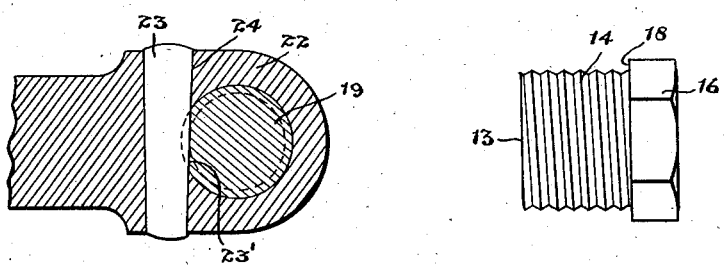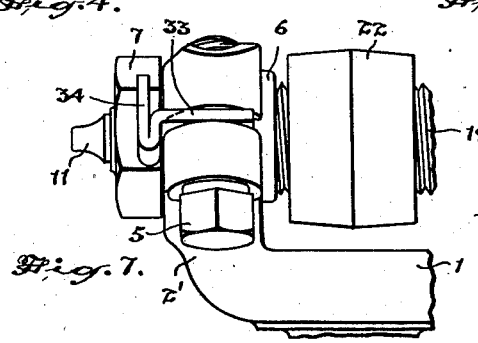

Patented Apr. 13, 1937

2,076,852

UNITED STATES PATENT OFFICE 2,076,852

ADJUSTABLE HINGE JOINT

John Wycliffe Leighton, Port Huron, Mich.

Application October 27, 1933, Serial No. 695,412

5 Claims. (Cl. 287—100)

The principal objects of this invention are to provide a hinge joint particularly adaptable for the king pin knuckle or the hinge connections between the member carried by the king pin and the arms connected with the car frame in an independent wheel suspension which will enable accurate and rapid assembly and will permit of simple and accurate adjustment of the hinge members in their relative positions and adjustment to compensate for wear of bearing surfaces.

The principal feature of the invention consists in the novel arrangement of a threaded bearing pin adjustably supported between threaded bearing members mounted in the paired lugs of one of the hinge members and carrying the other of said hinge members, whereby the spacing of the hinge members and the contact of the bearing surfaces may be accurately adjusted and the parts securely maintained in their adjusted positions.

In the drawings, Figure 1 is a part sectional elevation of the knuckle joint of a motor car wheel suspension constructed in accordance with this invention.

Figure 2 is an elevational sectional view showing the application of the invention to another form of hinge joint.

Figure 3 is an end elevational view of the structure illustrated in Figure 2.

Figure 4 is a cross section through the joint illustrated in Figure 2 taken on the line 4—4.

Figure 5 is a plan view of an externally threaded bushing.

Figure 7 is an elevational view showing a modified means for locking one of the bushings.

Figure 1:
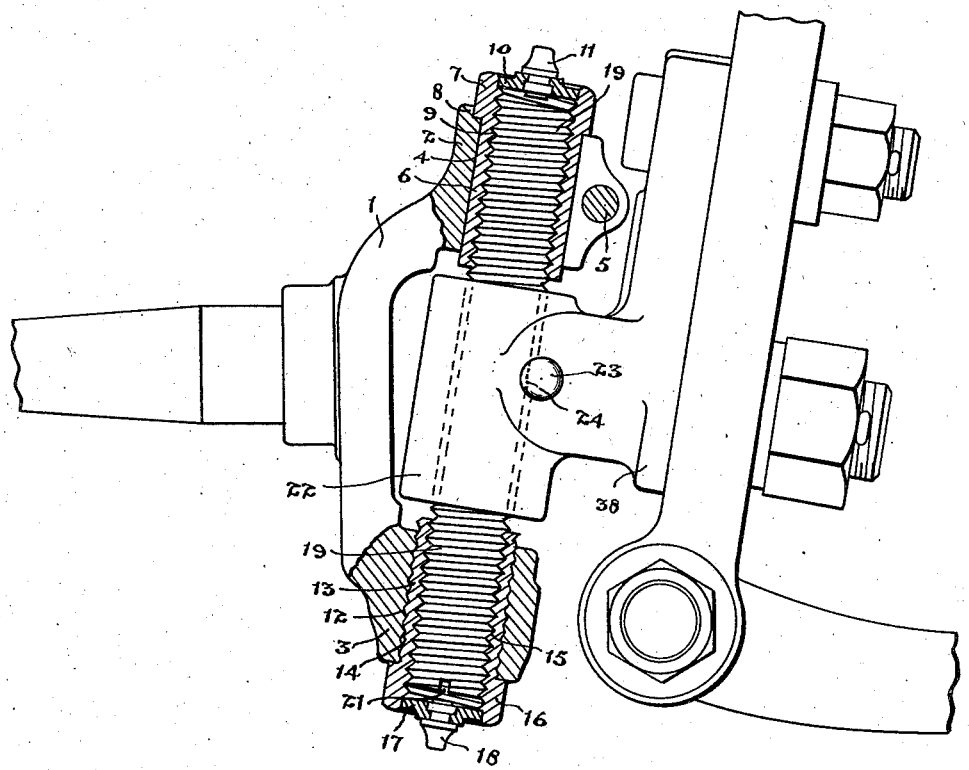

In the construction illustrated in Figure 1, the axle yoke 1 of a wheel knuckle is of forked construction having a pair of lugs 2 and 3 spaced apart and arranged in the usual oblique setting.

The lug 2 is formed with a cylindrical bore 4 and is split longitudinally and provided with a transversely arranged clamping bolt 5.

A bushing 6 having a cylindrical periphery is fitted into the cylindrical bore 4 of the lug 2 and is provided with a nut head 7 which engages the end of the lug, and a flat-faced projection 8 on the outward end of said lug engages one of the flat nut faces of the bushing to hold it from turning.

The bushing 6 is formed with an internal threaded bearing surface 9 and its outer end is closed with a disc 10 in which a suitable lubrication fitting 11 is secured.

The lug 3 of the knuckle is shown threaded internally with a flat obtuse angled thread 12 and a bushing 13, provided with a corresponding external flat obtuse angled thread 14 is fitted therein. The interior wall of said bushing is formed with an internal threaded bearing surface 15 corresponding with the bearing surface 9 of the bushing 6, both internal and external threads being of the same pitch. The outward end of the bushing 13 is provided with a nut head 16 which engages the end face of the lug 3 and when the bushing is screwed into the lug to bring the shoulder of the head into contact with the outer face of the lug a longitudinal stress is applied to cause the obtuse angled external thread of the bushing to lock securely in the threaded lug so that it will not loosen through the effects of vibration, but it may of course be easily removed by turning. The outer end of the bushing is closed by a disc 17 in which a suitable lubricating fitting 18 is secured. This bushing may be pressed into position.

A bearing pin 19 here shown threaded from end to end with a thread having a pitch and lead corresponding with the internal threads of the bushings 6 and 13 and said pin is threaded into said bushings, the extremeties thereof being spaced from the closed ends of said bushings. A screw slot 21 is provided in one end of said pin to enable its being threaded into place.

The other hinge member 22 is here shown in the form of a single lug spaced between the lugs 2 and 3 and it is threaded internally to fit snugly on the bearing pin 19 and a tapered cross hole is arranged therein to receive the tapered lock pin 23 which engages a slabbed surface 23' on the bearing pin 19 securely locking the bearing pin and hinge member from relative rotation.

In assembling the joint, the bushing 6 is preferably first inserted in the lug 2. The member 22 is then placed in the desired position in axial alignment between the lugs 2 and 3. The bearing pin 19 is then inserted through the free open lug 3 and threaded through the member 22 and into the bushing 6 the desired distance. The member 22 is then secured from rotation on the bearing pin by the tapered lock pin 23. The externally threaded bushing 13 is then inserted into the lug 3, the external lock thread thereof threading into the internal thread of the lug 3 and the internal thread of the bushing engaging the threaded bearing surface of the bearing pin. In assembling, the continuity of the bearing threads of the bushings may be adjusted by turning the bushing 6.

In order to adjust the bearing surfaces, the bushing 13 is first removed, then after loosening the clamping bolt 5 the bushing 6 may be pushed outwardly until the nut head clears the locking projection 8 on the lug 2. The bushing 6 may then be turned the required amount to tighten the threads so as to remove any end play of the bearing pin and it is then pressed back into place in the lug 2 and the bushing 13 is replaced.

The longitudinal location of the hinge member 22 on the bearing pin may be altered by removing the tapered lock pin and after removal of the bushing 13 the bearing pin may be turned in its threaded support in the bushing 6 to cause a relative movement of the member 22 lengthwise of the pin.

It must be understood that the assembly of the parts may be effected by first setting the relative spiral continuity of the bushing threads by fixing one bushing and turning the other and then inserting the bearing pin. Further, the bearing pin need not be threaded through the central hinge member.

The form of the invention illustrated in Figures 2 to 5 is substantially the same as illustrated in Figure 1, one bearing member with the lug 2' and 3' being in the form of a fork and the split lug being slightly different in detail structure.

Figure 6:
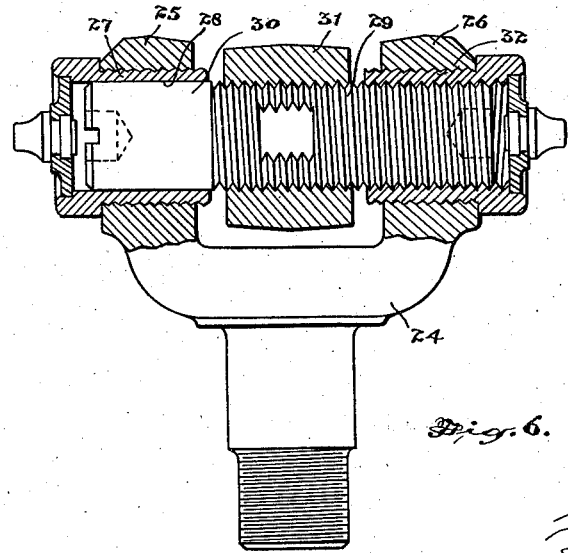
Figure 6 is a sectional elevational view of a further modified form of hinge joint assembly.

In the form of the invention illustrated in Figure 6, the hinge member 24 has the lugs 25 and 26 internally threaded with a flat obtuse angled thread similar to the threading of the lug 3 in the hinge member 1.

A bushing 27 is threaded into the lug 25 and this bushing is shown provided with a smooth bore 28.

The bearing pin 29 is provided with a cylindrical end 30 to fit in snug bearing engagement within the cylindrical bore in the bushing 27.

The remainder of the length of the pin is threaded externally and engages a threaded surface in the central hinge member 31 and also engages in bearing contact with the threaded interior of the bushing 32.

The hinge member 31 is non-rotatably secured on the bearing pin by a tapered lock pin.

This form of the invention may, under certain circumstances of manufacturing conditions, be found more desirable in the arrangement of the plain bearing surface at one end of the bearing pin as machining operations may be found more economical than the internal threading of the two bushings in alignment.

With a joint such as described the bearing pressure is carried on threaded bearing surfaces, and as this type of bearing surface has been very successfully adapted in motor car shackle constructions, its application to other bearings is highly desirable.

In the construction described provision is made for longitudinal adjustment on the line of the hinge axis which is essential to both king pin structures and individual wheel suspension structures, and in addition, the construction provides for the simple endwise adjustment of the threaded surfaces to remove end play and to provide that the bearing load is distributed uniformly on the bevelled thread surfaces of both bushings.

Furthermore, the construction provides not only for the initial snug adjustment of the bearing surfaces during assembly and the locking of such initial adjustment, but also provides for subsequent adjustment to compensate for wear of the bearing surfaces and the locking of such further adjustment and a hinge so constructed will give the maximum life in addition to its very desirable features of adjustability, eliminating the undesirable if not intolerable conditions resulting from slack bearings.

In Figure 7 is shown an alternative form of lock for the bushings in the form of a plate 33 which is placed in the slot of the split bushing and surrounds the locking bolt. The plate projects beyond the split lug and the end 34 is bent laterally to engage the nut end of the bushing.

It will be understood that as it is necessary to accurately locate the several parts of the joint assembly in relation to one another, the commencement point of the threads on the bushings and on both the joint lugs and the bearing pin must be arranged in a definite or fixed relationship so that when the parts are assembled the two hinge members will be in the required position. This may be accomplished by the use of suitable jigs or guides in the machining of the parts.

What I claim as my invention is:—

1. A hinge joint comprising a pair of aligned hinge lugs spaced apart, bushings mounted in said lugs having internal threaded bearing surfaces, a threaded bearing pin threaded in said bushings and extending between said lugs, a hinge member mounted on said bearing pin and axially adjustable relative thereto, and means for locking said hinge member on said pin at various points of adjustment.

2. A hinge joint, comprising a pair of aligned lugs, a bushing threaded internally and mounted in one of said lugs, a bushing threaded internally and being externally threaded into the other of said lugs, a pin having threaded bearing engagement with said bushings, a hinge member mounted on said pin, said first-mentioned bushing being rotatably interlocked with its lug but capable of axial sliding movement therein to a non-interlocked position whereby it may be rotatably adjusted to compensate for wear in the threaded bearing surfaces of said bushings and said pin and adapted thereafter to be moved axially into its rotatably interlocked relation to the lug, and means for locking said first-mentioned bushing in its various adjusted positions.

3. A hinge joint comprising a pair of aligned hinge lugs, a bushing threaded internally and having a cylindrical exterior rotatably mounted in one of said lugs and a nut end projecting beyond its supporting lug presenting side faces, a locking projection on the lug selectively engageable with the side faces of said nut and to lock said bushing from rotation and disengageably associated with said nut end to permit adjustment of the bushing, a bushing threaded into the other of said lugs and having an internal bearing thread, a bearing pin threaded to fit the threaded bearing surfaces of said bushings, a hinge member mounted on and supported by said bearing pin between the aforesaid bearing lugs, and means co-operative with said first-mentioned bushing for securing same in any of its adjusted positions with the nut end thereof in interlocked relation to the said locking projection.

4. A hinge joint comprising a yoke member having on one side a fixed threaded bearing and on the other side a split clamping lug, a threaded bearing adjustable in said split lug to align its threaded bearing surfaces in spiral continuity with the threads of the fixed bearing, a hinge member having external threaded bearing surfaces engaging in bearing contact with the threaded bearing surfaces of said yoke, a clamping bolt co-operating with said split clamping lug to constrict the same on its bearing and firmly grip the same in any desired adjusted relation to said split lug and to the said other bushing, and a locking member secured by said clamping bolt and extending into non-rotative interlocked relation with the adjusted bearing to positively prevent turning thereof in the split lug.

5. A hinge joint, comprising a pair of hinge lugs rigidly connected, bushings secured in said lugs having internal bearing threads, a hinge pin having a threaded surface extending continuously from end to end and engaging the threaded surfaces of said bushings at the ends and having a slab portion intermediate of its length, a hinge member adjustably threaded on said hinge pin intermediate of its length, and a locking pin extending through the latter member and engaging the slab member of said hinge pin, said slab portion being extended longitudinally of the threaded pin to either side of said locking pin whereby the said locking pin co-operates therewith in the various threaded adjustments of said hinge member and threaded pin.

JOHN WYCLIFFE LEIGHTON.